United States Patent
McNamara et al.

(10) Patent No.: US 7,444,137 B1
(45) Date of Patent: Oct. 28, 2008

(54) CELL BROADCAST VIA ENCODED MESSAGE TO AN EMBEDDED CLIENT

(75) Inventors: Justin McNamara, Atlanta, GA (US); Jeffrey Clinton Mikan, Cumming, GA (US); Carolyn Tuthill, Atlanta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 319 days.

(21) Appl. No.: 11/265,601

(22) Filed: Nov. 1, 2005

(51) Int. Cl.
  *H04M 3/42* (2006.01)
  *H04M 3/493* (2006.01)
  *H04Q 7/22* (2006.01)
  *H04Q 7/38* (2006.01)
  *H04Q 7/24* (2006.01)
  *H04L 29/06* (2006.01)

(52) U.S. Cl. .............. 455/414.1; 455/414.2; 455/414.3; 370/338

(58) Field of Classification Search ................. 370/259, 370/270, 338; 455/410, 411, 414.1–414.3, 455/456.3; 709/219; 725/62
See application file for complete search history.

(56) References Cited

U.S. PATENT DOCUMENTS

| | | | |
|---|---|---|---|
| 6,097,949 A | 8/2000 | Jung et al. | |
| 6,449,719 B1 | 9/2002 | Baker | |
| 6,493,559 B1 | 12/2002 | Pecen et al. | |
| 6,556,835 B1 * | 4/2003 | Raivisto | 455/466 |
| 7,096,044 B2 * | 8/2006 | Gil et al. | 455/566 |
| 7,123,719 B2 * | 10/2006 | Sowa et al. | 380/247 |
| 7,254,614 B2 | 8/2007 | Mulligan et al. | |
| 7,269,146 B2 | 9/2007 | Pecen et al. | |
| 7,289,788 B2 | 10/2007 | Shan | |
| 2001/0005670 A1 | 6/2001 | Lahtinen | |
| 2003/0007499 A1 | 1/2003 | Rajahalme | |
| 2003/0208613 A1 * | 11/2003 | Signes et al. | 709/231 |
| 2004/0038645 A1 * | 2/2004 | Rcunamaki et al. | 455/41.2 |
| 2004/0081192 A1 | 4/2004 | Koulakiotis et al. | |

(Continued)

FOREIGN PATENT DOCUMENTS

GB 2407002 4/2005

(Continued)

OTHER PUBLICATIONS

David Gunlegård, "Automotive Telematics Services based on Cell Broadcast," Master's thesis, Department of Science and Technology, Linköping University, Norrköping, Sweden, May 8, 2003, 55 pages.

(Continued)

*Primary Examiner*—Lester Kincaid
*Assistant Examiner*—Nathan Mitchell
(74) *Attorney, Agent, or Firm*—Zagorin O'Brien Graham LLP

(57) ABSTRACT

A system for authorizing information services that are provided via broadcast messages to mobile stations. The broadcast messages are encrypted prior to being communicated to devices within a geographic area. The mobile stations are provided with a client application that retrieves cryptographic keys associated with the information services to which a customer is subscribed. When the mobile station receives encrypted broadcast messages, the client application determines if it has the cryptographic key to decrypt the message. If so, the information contained in the message is displayed. If not, then the message is ignored by the mobile station.

23 Claims, 2 Drawing Sheets

U.S. PATENT DOCUMENTS

| | | |
|---|---|---|
| 2004/0106396 A1* | 6/2004 | Segura et al. ............ 455/414.1 |
| 2004/0110462 A1 | 6/2004 | Forstadius |
| 2004/0204092 A1 | 10/2004 | Sato |
| 2005/0037728 A1 | 2/2005 | Binzel et al. |
| 2005/0117743 A1* | 6/2005 | Bender et al. ................. 380/28 |
| 2005/0266864 A1* | 12/2005 | Chen et al. .................. 455/466 |
| 2006/0007920 A1 | 1/2006 | Michel et al. |
| 2006/0025157 A1 | 2/2006 | Kuwahara et al. |
| 2006/0069746 A1 | 3/2006 | Davis et al. |
| 2006/0092953 A1 | 5/2006 | Haverinen et al. |
| 2006/0107287 A1 | 5/2006 | Lee et al. |
| 2006/0155698 A1* | 7/2006 | Vayssiere ....................... 707/6 |
| 2006/0223499 A1 | 10/2006 | Pecen et al. |
| 2006/0265489 A1* | 11/2006 | Moore ........................ 709/223 |
| 2006/0293028 A1 | 12/2006 | Gadamsetty et al. |

FOREIGN PATENT DOCUMENTS

| | | |
|---|---|---|
| WO | 9966747 | 12/1999 |
| WO | 0172062 | 9/2001 |

OTHER PUBLICATIONS

U.S. Appl. No. 11/265,602, filed Nov. 1, 2005, entitled "Cell Broadcast Updates to Application Software," naming inventors Justin McNamara, Jeffrey C. Mikan and Carolyn Tuthill.

* cited by examiner

CELL BROADCAST VIA ENCODED MESSAGE TO AN EMBEDDED CLIENT

FIELD OF THE INVENTION

The present invention is directed to wireless services. In particular, the present invention is directed to a system for authenticating messages transmitted via a broadcast mechanism to a client device.

BACKGROUND OF THE INVENTION

Global system for mobile communication (GSM) is one of the most widely wireless access systems in today's fast growing communication systems. GSM provides circuit-switched data services to subscribers, such as mobile telephone or computer users. General Packet Radio Service (GPRS), which is an extension to GSM technology, introduces packet switching to GSM networks. GPRS uses a packet-based wireless communication technology to transfer high and low speed data and signaling in an efficient manner. GPRS optimizes the use of network and radio resources, thus enabling the cost effective and efficient use of GSM network resources for packet mode applications.

Conventional GSM systems provide for broadcast services, such as cell broadcast. When a cell broadcast is made, all clients of such systems receive the broadcast message. Conventional systems are unable to place limitations on which clients are able/authorized to receive specific broadcast messages. This prevents providers from determining which subscribers are actually listening to the message and from authenticating who may receive the broadcast messages.

SUMMARY OF THE INVENTION

A system for authorizing information services that are provided via broadcast messages to mobile stations/wireless devices via a wireless network. The broadcast messages are encrypted prior to being communicated to devices within a geographic area. The mobile stations are provided with a client application that retrieves cryptographic keys associated with the information services to which a customer is subscribed. When the wireless device receives the encrypted broadcast messages, the client application determines if it has the cryptographic key to decrypt the message. If so, the information contained in the message is displayed. If not, then the message is ignored by the mobile station.

The wireless network includes a push proxy gateway (PPG), a short message peer to peer (SMPP) router that receives SMPP messages from the push proxy gateway and converts the SMPP messages to cell broadcast messages, and a cell broadcast center that communicates the cell broadcast messages to the mobile station client application. The wireless network updates the mobile station client application such that the application is aware of the services that are provisioned for the customer. The cryptographic key may be set to expire at a predetermined time.

Additional features of the invention are described below.

DETAILED DESCRIPTION OF ILLUSTRATIVE EMBODIMENTS

Figure 1:
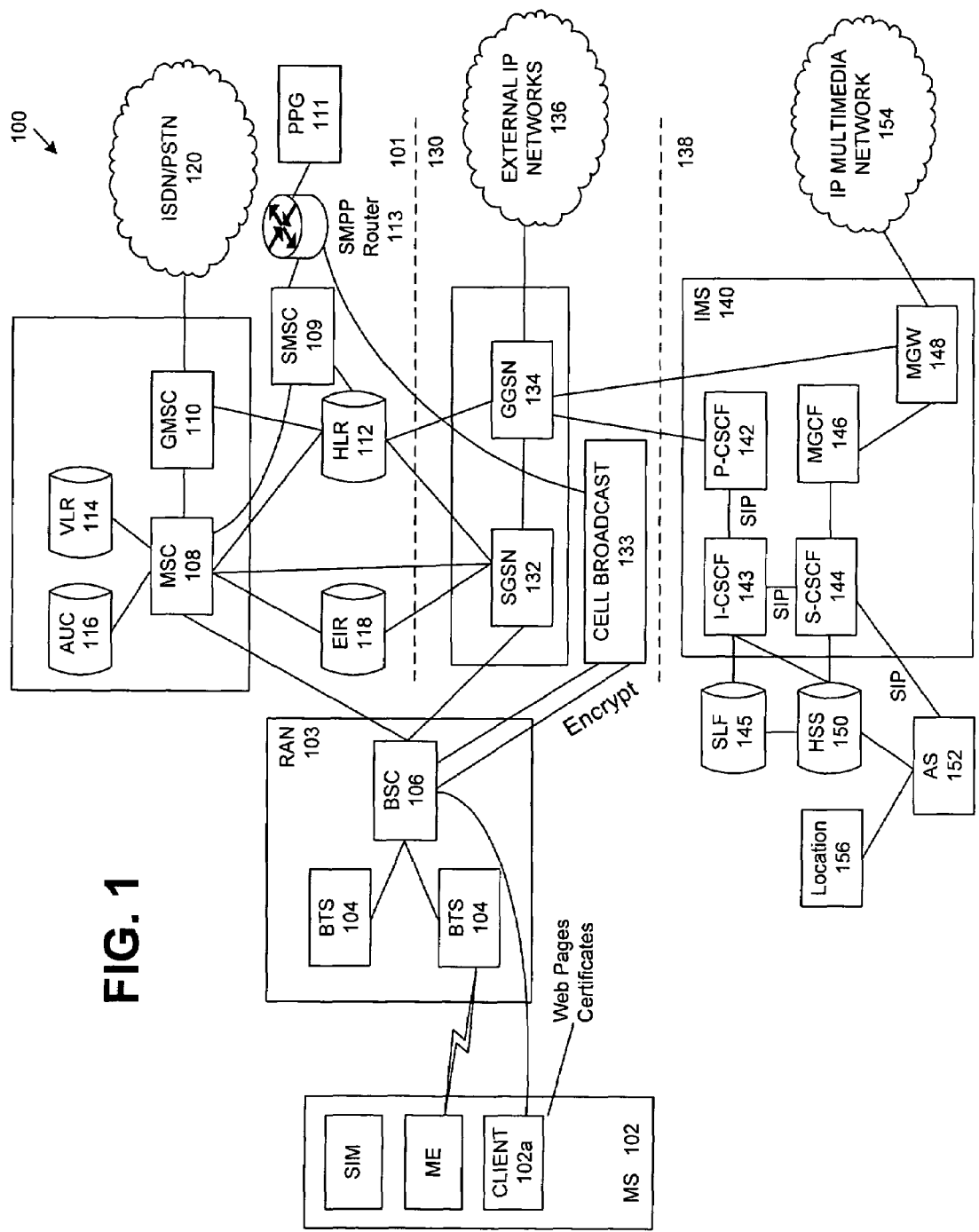
FIG. 1 illustrates an exemplary GSM/GPRS/IP multimedia network architecture.

FIG. 1 shows a GSM/GPRS/IP multimedia network architecture 100 that includes a GSM core network 101, a GPRS network 130 and an IP multimedia network 138. The GSM core network 101 includes a Mobile Station (MS) 102, at least one Base Transceiver Station (BTS) 104 and a Base Station Controller (BSC) 106. The MS 102 is physical equipment or Mobile Equipment (ME), such as a mobile phone or a laptop computer that is used by mobile subscribers, with a Subscriber identity Module (SIM). The SIM includes an International Mobile Subscriber Identity (IMSI), which is a unique identifier of a subscriber. The MS 102 includes an embedded client 102a that receives and processes messages received by the MS 102. The embedded client 102a may be implemented in JAVA and is more fully below.

The BTS 104 is physical equipment, such as a radio tower, that enables a radio interface to communicate with the MS. Each BTS may serve more than one MS. The BSC 106 manages radio resources, including the BTS. The BSC may be connected to several BTSs. The BSC and BTS components, in combination, are generally referred to as a base station (BSS) or radio access network (RAN) 103.

The GSM core network 101 also includes a Mobile Switching Center (MSC) 108, a Gateway Mobile Switching Center (GMSC) 110, a Home Location Register (HLR) 112, Visitor Location Register (VLR) 114, an Authentication Center (AuC) 118, and an Equipment Identity Register (EIR) 116. The MSC 108 performs a switching function for the network. The MSC also performs other functions, such as registration, authentication, location updating, handovers, and call routing. The GMSC 110 provides a gateway between the GSM network and other networks, such as an Integrated Services Digital Network (ISDN) or Public Switched Telephone Networks (PSTNs) 120. In other words, the GMSC 110 provides interworking functionality with external networks.

The HLR 112 is a database that contains administrative information regarding each subscriber registered in a corresponding GSM network. The HLR 112 also contains the current location of each MS. The VLR 114 is a database that contains selected administrative information from the HLR 112. The VLR contains information necessary for call control and provision of subscribed services for each MS currently located in a geographical area controlled by the VLR. The HLR 112 and the VLR 114, together with the MSC 108, provide the call routing and roaming capabilities of GSM. The AuC 116 provides the parameters needed for authentication and encryption functions. Such parameters allow verification of a subscriber's identity. The EIR 118 stores security-sensitive information about the mobile equipment.

A Short Message Service Center (SMSC) 109 allows one-to-one Short Message Service (SMS) messages to be sent to/from the MS 102. A Push Proxy Gateway (PPG) 111 is used to "push" (i.e., send without a synchronous request) content to the MS 102. The PPG 111 acts as a proxy between wired and wireless networks to facilitate pushing of data to the MS 102. A Short Message Peer to Peer (SMPP) protocol router 113 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 102 sends a location update including its current location information to the MSC/VLR, via the BTS 104 and the BSC 106. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 130 is logically implemented on the GSM core network architecture by introducing two packet-switching network nodes, a serving GPRS support node (SGSN) 132, a cell broadcast and a Gateway GPRS support node (GGSN) 134. The SGSN 132 is at the same hierarchical level as the MSC 108 in the GSM network. The SGSN controls the connection between the GPRS network and the MS 102. The SGSN also keeps track of individual MS's locations and security functions and access controls.

A Cell Broadcast Center (CBC) 133 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 134 provides a gateway between the GPRS network and a public packet network (PDN) or other IP networks 136. That is, the GGSN provides interworking functionality with external networks, and sets up a logical link to the MS through the SGSN. When packet-switched data leaves the GPRS network, it is transferred to an external TCP-IP network 136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 130 can be designed to operate in three network operation modes (NOM1, NOM2 and NOM3). A network operation mode of a GPRS network is indicated by a parameter in system information messages transmitted within a cell. The system information messages dicate a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not received pages from a circuit switched domain when engaged in a data call, since the MS is receiving data and is not listening to a paging channel. In a NOM3 network, a MS can monitor pages for a circuit switched network while receiving data and vise versa.

The IP multimedia network 138 was introduced with 3GPP Release 5, and includes an IP multimedia subsystem (IMS) 140 to provide rich multimedia services to end users. A representative set of the network entities within the IMS 140 are a call/session control function (CSCF), a media gateway control function (MGCF) 146, a media gateway (MGW) 148, and a master subscriber database, called a home subscriber server (HSS) 150. The HSS 150 may be common to the GSM network 101, the GPRS network 130 as well as the IP multimedia network 138.

The IP multimedia system 140 is built around the call/session control function, of which there are three types: an interrogating CSCF (I-CSCF) 143, a proxy CSCF (P-CSCF) 142, and a serving CSCF (S-CSCF) 144. The P-CSCF 142 is the MS's first point of contact with the IMS 140. The P-CSCF 142 forwards session initiation protocol (SIP) messages received from the MS to an SIP server in a home network (and vice versa) of the MS. The P-CSCF 142 may also modify an outgoing request according to a set of rules defined by the network operator (for example, address analysis and potential modification).

The I-CSCF 143, forms an entrance to a home network and hides the inner topology of the home network from other networks and provides flexibility for selecting an S-CSCF. The I-CSCF 143 may contact a subscriber location function (SLF) 145 to determine which HSS 150 to use for the particular subscriber, if multiple HSS's 150 are present. The S-CSCF 144 performs the session control services for the MS 102. This includes routing originating sessions to external networks and routing terminating sessions to visited networks. The S-CSCF 144 also decides whether an application server (AS) 152 is required to receive information on an incoming SIP session request to ensure appropriate service handling. This decision is based on information received from the HSS 150 (or other sources, such as an application server 152). The AS 152 also communicates to a location server 156 (e.g., a Gateway Mobile Location Center (GMLC)) that provides a position (e.g., latitude/longitude coordinates) of the MS 102.

The HSS 150 contains a subscriber profile and keeps track of which core network node is currently handling the subscriber. It also supports subscriber authentication and authorization functions (AAA). In networks with more than one HSS 150, a subscriber location function provides information on the HSS 150 that contains the profile of a given subscriber.

The MGCF 146 provides interworking functionality between SIP session control signaling from the IMS 140 and ISUP/BICC call control signaling from the external GSTN networks (not shown). It also controls the media gateway (MGW) 148 that provides user-plane interworking functionality (e.g., converting between AMR- and PCM-coded voice). The MGW 148 also communicates with other IP multimedia networks 154.

Figure 2:
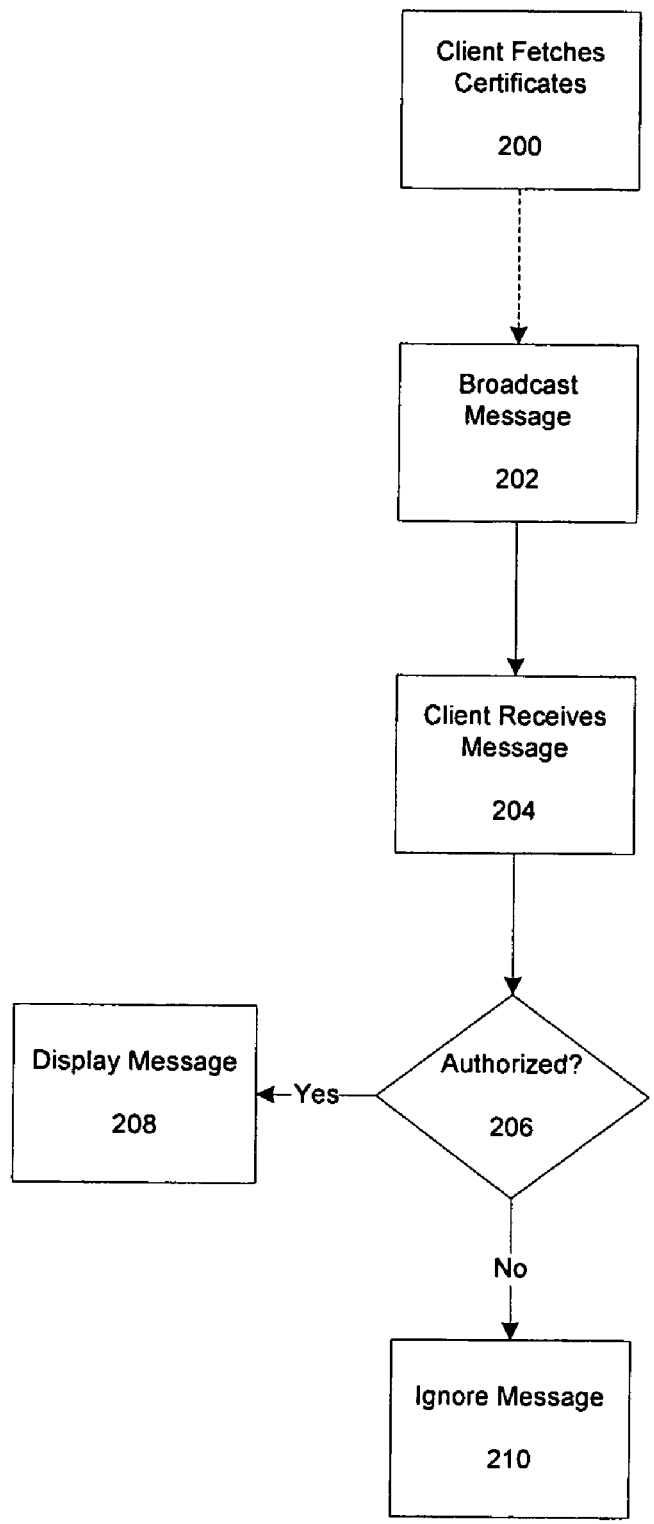
FIG. 2 illustrates exemplary processes performed in accordance with the present invention.

With reference to FIG. 2, there is illustrated the operation of the present invention in greater detail. At step 200, the client 102a fetches cryptographic keys/certificates that are used to enable the client 102a to decrypt/decode the message in accordance with, e.g., a service subscription, network provider/carrier offering, special event, etc. The keys may be time dependent or stored in such a manner on the MS 102 such that if a customer does not pay for a service or if a promotion ends, the keys expire or are removed. The client 102a would then not be able to access subsequent messages, as described below.

The embedded client 102a recognizes for which services the customer is provisioned. If the network changes or services are added, the MS 102 and the other network components can be updated via SMS. A device management (DM) message can be sent to the MS 102 using SMS to update the capabilities of the MS 102. The SMSC 109 receives the SMS message to be communicated to update the MS 102. The HLR 112 is interrogated to determine the routing information for the MS 102. The SMSC 109 sends the short message to the MSC 108. The MSC 108 retrieves the customer information from the VLR 114. This operation may include an authentication procedure. The MSC 108 then transfers the short message to the MS 102. The MSC 108 returns the outcome of the operation to the SMSC 109. If requested by the originator, the SMSC 109 may return a status report indicating delivery of the short message.

Using this mechanism, the carrier may repopulate the customer's account with new valid time dependent keys that permit access to the provisioned information and/or services. With the appropriate provisioning, it would then be possible to receive web pages and other information contained in the cell broadcast.

At step 202, the CBC 133 transmits a broadcast message to the BSC 106. The message is preferably encrypted or protected via a rights management system. The BSC 106 communicates the message via the BTS 104, which is received by each MS 102 that is able to hear the message.

At step 204, the client 102a receives the message and processes it to determine if the embedded client 102a is able to decrypt or authorize the message (step 206). If the client 102a is authorized or able to decrypt the message, then at step 208, information received in the message is displayed on the MS 102. If a particular MS 102 does not have a client 102a, or if the client 102a does not have authorization to decode/decrypt the message, the MS 102 will ignore the message (step 210).

Thus, a network operator or carrier may provide weather alerts or other information for a fee. If a customer subscribes to this service, the client 102a in the customer's MS 102 may receive a certificate/cryptographic key related to this service that will allow the client 102a to decode the messages containing content related to the service. The messages may be multi-part. For example, a first encoded/encrypted XML document may be received that is decoded/decrypted by the client 102a. The client 102a may then make a request to receive more information, such as a streaming download to display the weather for that location.

Alternatively, carriers may "push" a stream to the MS 102 containing information about, e.g., the weather or other interest category. This may be a near real-time push, such as replay of sporting events, traffic alert details, etc. Alternative routes may be provided in the latter scenario.

While the present invention has been described in connection with the preferred embodiments of the various Figs., it is to be understood that other similar embodiments may be used or modifications and additions may be made to the described embodiment for performing the same function of the present invention without deviating therefrom. For example, one skilled in the art will recognize that the present invention as described in the present application may apply to any environment, whether wired or wireless, and may be applied to any number of such devices connected via a communications network and interacting across the network. Therefore, the present invention should not be limited to any single embodiment, but rather should be construed in breadth and scope in accordance with the appended claims.

What is claimed is:

1. A method of receiving of a communication at a mobile station having a subscriber identity module for uniquely identifying a subscriber, said mobile station communicatively connected to a wireless network serving said uniquely identified subscriber, comprising:

running an embedded client application for recognizing services provisioned for said uniquely identified subscriber, said embedded client application being within said mobile station;

transmitting from said mobile station a location update and international subscriber identity to said wireless network including current location information;

receiving authorization for a particular service responsive to a service subscription of said uniquely identified subscriber to said particular service, said particular service being related to a particular event occurring in a predetermined geographic area;

receiving a broadcast encrypted document communication from said wireless network directed to all mobile stations within said predetermined geographic area proximate to said current location of said mobile station;

displaying information contained in said communication in accordance with said authorization for said particular service of said service subscription;

transmitting a request for additional information; and receiving a streaming download responsive to said request and related to said displayed information and said particular service.

2. The method of claim 1, said receiving authorization further comprises providing said mobile station a cryptographic key associated with said particular service, said cryptographic key for decrypting said broadcast encrypted document information and said streaming download.

3. The method of claim 2, further comprising expiring said cryptographic key at a predetermined time, the cryptographic key associated with said particular service being time dependent.

4. The method of claim 2, further comprising decrypting said broadcast encrypted document communication if said mobile station is authorized for said particular service using said cryptographic key associated with said service stored in said mobile station to obtain said information in such a manner that if one of a promotion for said particular service has ended and payment is not received for said particular service, said cryptographic key associated with said service expires or is removed.

5. The method of claim 4, further comprising:

retrieving additional information from said wireless network based on said information decrypted from said broadcast encrypted document communication, said communication comprising multiple parts; and displaying said additional information on said mobile station in near real-time where said additional information comprises an event replay.

6. The method of claim 2, further comprising instructing said mobile station to retrieve said cryptographic key from said wireless network via a one-to-one short message service (SMS) message.

7. The method of claim 6, further comprising:

provisioning said service at said wireless network via a home subscriber server for containing a subscriber profile in accordance with a subscriber request for said particular service, the home subscriber server adapted to contain the subscriber profile for said uniquely identified subscriber; and communicating said one-to-one short message service message as a result of said provisioning.

8. A method of providing information related to a particular service to mobile stations of a wireless network in a geographic area, comprising:

receiving a location update message and international subscriber identity, the message including the current location information of a mobile station including a subscriber identity module including the unique identification of a subscriber, the current location information corresponding to said geographic area;

storing a subscriber profile for said subscriber at a home subscriber server including the current wireless network node handling said subscriber;

providing to predetermined ones of said mobile stations a cryptographic key via a device management message using short message service associated with said information related to said particular service in accordance with a customer subscription to said particular service and, said predetermined ones of said mobile stations having presubscribed to said particular service and said cryptographic key being associated with said particular service, each such predetermined mobile station having an embedded client application for recognizing said particular service being provisioned for an associated subscriber;

encrypting said information related to said particular service with said cryptographic key associated with said particular service;

broadcasting said encrypted information to said mobile stations in a one-to-many communication within said geographic area, said encrypted information being decrypted by said cryptographic key by said predetermined ones of said mobile stations, said encrypted information being associated with an event occurring within said geographic area according to said embedded client application, the event being related to said particular service;

responsive to a request for additional information related to said particular service, broadcasting said additional information as a streaming download; and billing said unique subscribers associated with said predetermined ones of said mobile stations for said particular service.

9. The method of claim 8, said cryptographic key being time dependent, further comprising expiring said cryptographic key at a predetermined time, said mobile stations receiving new valid time dependent keys via a device management message of short message service.

10. The method of claim 8, further comprising:

receiving a request for said customer subscription for said particular service; and instructing a mobile station associated with said customer subscription to retrieve said cryptographic key for said particular service using a one-to-one short message service message.

11. The method of claim 8, further comprising providing an embedded client application that is downloaded to said predetermined ones of said mobile stations that accesses said cryptographic key for said particular service to decrypt said information.

12. The method of claim 8, further comprising broadcasting said encrypted information related to said particular service from a cell broadcast center.

13. The method of claim 8, further comprising:

receiving a request for additional information from said predetermined ones of said mobile stations after said predetermined ones of said mobile stations have decrypted said encrypted information related to said particular service; and providing said additional information to said predetermined ones of said mobile stations as a one-to-one short message service communication.

14. The method of claim 13, wherein said additional information is multimedia content and related to said event occurring in said geographic area according to said embedded client application.

15. A system for delivering content via a wireless network to a mobile station using a broadcast mechanism, comprising:

a mobile switching center/visiting location register for receiving a location update and international mobile subscriber identity including a current location of said mobile station and forwarding same to a home location register;

a push proxy gateway (PPG) for pushing content of a particular service to a mobile station within a geographic area, the content being associated with said current location within said geographic area, the mobile station having a subscriber identity module for uniquely identifying a subscriber associated with said mobile station; the subscriber having subscribed to said particular service;

a home subscriber server containing a subscriber profile for said uniquely identified subscriber, the home subscriber server for supporting authentication and authorization functions;

a short message peer to peer (SMPP) router that receives SMPP messages including content of said particular subscribed to service from said push proxy gateway and converts said SMPP messages to cell broadcast messages;

a cell broadcast center that communicates said cell broadcast messages; and an embedded mobile station client that is provided to mobile stations to receive said cell broadcast messages, said embedded mobile station being provisioned and authorized for said particular subscribed-to service.

16. The system of claim 15, wherein said cell broadcast messages are encrypted using a cryptographic key associated with said particular subscribed-to service.

17. The system of claim 16, wherein said home location register is interrogated for routing information to said mobile station and said embedded mobile station client for said mobile station accesses a cryptographic key to decrypt said cell broadcast messages via a device management message using short message service.

18. The system of claim 17, the cryptographic key associated with said particular service being time dependent, wherein said cryptographic key expires at a predetermined time.

19. The system of claim 15, wherein a one-to-one short message service message is communicated to said mobile station client to update said mobile station client in accordance with a customer subscription to said content of said particular subscribed-to service.

20. The system of claim 19, wherein said message instructs said mobile station to fetch a cryptographic key associated with said content of said particular subscribed-to service.

21. The method of claim 1, wherein the embedded client application is an embedded JAVA client application.

22. The method of claim 1, wherein the encrypted document communication is an encrypted XML document communication.

23. The system of claim 15, wherein the embedded client application is an embedded JAVA client application.

* * * * *